UNITED STATES PATENT OFFICE.

ERWIN W. SIMONS, OF SCHUYLER, NEBRASKA.

CORNMEAL PRODUCT.

No. 876,662.     Specification of Letters Patent.     Patented Jan. 14, 1908.

Application filed December 27, 1905. Serial No. 293,510.

*To all whom it may concern:*

Be it known that I, ERWIN W. SIMONS, citizen of the United States, residing at Schuyler, in the county of Colfax and State of Nebraska, have invented certain new and useful Improvements in Cornmeal Products, of which the following is a specification.

My invention has reference to a corn-meal product and a process for producing the product; and it contemplates increasing the flavor, sweetness and nutritive qualities of corn meal and assuring the same remaining wholesome for an indefinite period in different climates and temperatures and under varying conditions.

In carrying out the process and producing the product, I first separate what are known as the "germs" from the balance of a mass of corn which may be either white corn, red, mixed or hybrid varieties or yellow corn. This segregation of the "germs" may be effected in the manner common in milling corn or in any other manner compatible with the purpose of my invention, and after it is accomplished the "germs" are dried or parched through the medium of any suitable apparatus until the same are reduced to a thoroughly crisp state. I then take the dried or parched "germs", and, with the aid of the ordinary or any other approved machinery, grind and bolt the same after which I blend the meal produced as stated with the proper proportion of a regular run of corn meal.

Heretofore the "germs" which comprise valuable nutritious constituents and practically all the elements which contribute flavor and sweetness to meal, have been carefully eliminated from the remainder of the corn precedent to the reduction of such remainder to meal, and have been mixed with other ingredients to form stock feed, this because a large percentage of oil is present in the "germs" and the same are likely when incorporated in meal to develop heat or become rancid after a short time and thereby render the meal unfit for human consumption. It will be noticed, however, that the "germ" drying or parching step of my process counteracts to a considerable extent and practically neutralizes the tendency of the "germs" to become rancid, with or without heat, minimizing tendency to heat, and consequently renders it feasible to utilize such portion of the corn for corn meal; and it will also be appreciated that the "germs" not only increase the quantity of meal yielded by a given quantity of corn but by adding flavor, sweetness and nutritive elements to the meal materially enhance the market value thereof.

In practice the proportions in which the meal produced from the "germs" and the meal produced from the remainder of the corn are combined varies according to the quality and condition of the corn and the character of the meal which it is desired to produce, and I, therefore, prefer to leave such proportions to the discretion of the miller; and I would also have it understood that the purpose of my invention is attained in the drying or parching step when the "germs" become sufficiently crisp to grind readily and properly, the time to which the "germs" are subjected to heat depending on the condition of the corn when it is delivered at the mill.

Having described my invention, what I claim and desire to secure by Letters Patent, is—

A corn meal product comprising meal formed by drying or parching corn "germs" while they are in their natural form and state until the same are reduced to a crisp state, whereby the tendency of the "germs" to become rancid is obviated, and grinding the said "germs", and ordinary corn meal blended with the first mentioned meal.

In testimony whereof I affix my signature in presence of two witnesses.

ERWIN W. SIMONS.

Witnesses:
EMMA McRAE,
E. B. CARL.